United States Patent [19]

Kadomatsu et al.

[11] Patent Number: 4,547,554

[45] Date of Patent: Oct. 15, 1985

[54] AFTER-CHLORINATED ETHYLENE/BUTENE-1 COPOLYMER AND PROCESS FOR ITS PRODUCTION

[75] Inventors: Seiji Kadomatsu, Toyonaka; Kozo Misumi, Sennan, both of Japan

[73] Assignee: Osaka Soda Co., Ltd., Osaka, Japan

[21] Appl. No.: 506,877

[22] Filed: Jun. 22, 1983

[30] Foreign Application Priority Data

Jun. 25, 1982 [JP] Japan ................. 57-108454

[51] Int. Cl.⁴ .............................. C08F 8/22
[52] U.S. Cl. ................. 525/334.1; 525/358
[58] Field of Search ............... 525/334.1, 358; 526/348.6

[56] References Cited

U.S. PATENT DOCUMENTS 3,867,315  2/1975  Tigner et al. ............... 252/518
3,874,987  4/1975  Young ..................... 428/319.7
4,104,289  8/1978  Jones ........................ 524/586
4,433,105  2/1984  Matsuda et al. ........... 525/332.1

Primary Examiner—Bernard Lipman
Attorney, Agent, or Firm—Sherman & Shalloway

[57] ABSTRACT

An after-chlorinated ethylene/butene-1 copolymer useful as a rubber material having especially good cold resistance characterized by having (a) 1 to 2 methyl groups per 100 carbon atoms,
(b) a chlorine content of 25 to 35% by weight,
(c) a weight average molecular weight of not less than 100,000,
(d) a heat of fusion, determined by differential scanning calorimetry, of not more than 0.5 cal/g, and
(e) an ethylene content of 93 to 97% by weight and a butene-1 content of 7 to 3% by weight.

A process for its production is also provided.

5 Claims, No Drawings

AFTER-CHLORINATED ETHYLENE/BUTENE-1 COPOLYMER AND PROCESS FOR ITS PRODUCTION

This invention relates to an after-chlorinated ethylene/butene-1 copolymer which is not described in the prior literature, and specifically, to an after-chlorinated ethylene/butene-1 copolymer useful as a rubber material having especially good cold resistance, and a process for its production.

According to this invention, an after-chlorinated ethylene/butene-1 copolymer having excellent rubber properties both at room temperature and low temperatures can be produced industrially advantageously with an excellent reproducibility of its quality without agglomeration (for example, the copolymer has an average particle size of not more than 0.1 mm).

More specifically, this invention pertains to an after-chlorinated ethylene/butene-1 copolymer having the following characteristics (a) to (e).

(a) It has 1 to 2 methyl groups per 100 carbon atoms;
(b) it has a chlorine content of 25 to 35% by weight;
(c) it has a weight average molecular weight of not less than 100,000;
(d) it has a heat of fusion of its crystalline portion, determined by differential scanning calorimetry (DCS), of not more than 0.5 cal/g, and
(e) it has an ethylene content of 93 to 97% by weight and a butene-1 content of 7 to 3% by weight.

Usually, the after-chlorinated ethylene/butene-1 copolymer of this invention further has the following characteristics (f) and (g).

(f) It has a 100% modulus at room temperature of not more than 10 kg/cm$^2$; and
(g) it has a 25% modulus at $-20°$ C. of not more than 100 kg/cm$^2$.

The present invention also relates to a process for producing the aforesaid after-chlorinated ethylene/butene-1 copolymer. In particular, it relates to a process for producing an after-chlorinated ethylene/butene-1 copolymer having a 100% modulus at room temperature of not more than 10 kg/cm$^2$ and a 25% modulus at $-20°$ C. of not more than 100 kg/cm$^2$, which comprises a first step of chlorinating an ethylene polymer in aqueous suspension at a temperature at least 5° C. lower than the crystalline melting point determined by differential scanning calorimetry of the polymer while feeding chlorine gas, a second step of heat-treating the chlorinated ethylene polymer at a temperature higher than the crystalline melting point determined by differential scanning calorimetry of the chlorinated ethylene polymer and at least 5° C. higher than the chlorinating temperature in the first step in the substantial absence of chlorine gas without feeding chlorine gas, and a third step of chlorinating the resulting heat-treated chlorinated ethylene polymer in aqueous suspension at a temperature lower than the crystalline melting point of the starting polymer determined by differential scanning calorimetry and equal to, or lower than, the temperature in the second step with the feeding of chlorine gas until the final chlorine content is reached; characterized in that (a) in the first step, an ethylene/butene-1 copolymer having a density of 0.915 to 0.930, an ethylene content of 93 to 97% by weight, a butene-1 content of 7 to 3% by weight and a crystalline melting point, determined by differential scanning calorimetry, of 115° to 125° C., at least a part of said copolymer being a crystalline linear ethylene copolymer, and at least 30% by weight of said crystalline portion being meltable at a temperature of not more than 110° C., is chlorinated at a temperature of 100° to 115° C. in aqueous suspension until its chlorine content reaches 10 to 20%, (b) the second step is carried outt at a temperature at least 5° C. higher than the temperature of the first step and not higher than the crystalline melting point, determined by differential scanning calorimetry, of the starting ethylene/butene-1 copolymer, and (c) the third step is carried out at a temperature 6±2° C. lower than the crystalline melting point, determined by differential scanning calorimetry, of the starting ethylene/butene-1 copolymer until the chlorine content of the final product reaches 25 to 35% by weight.

Some methods have previously been proposed for the production of a chlorinated ethylene polymer in a multiplicity of steps including heat-treatment step without feeding chlorine gas (for example, see Japanese Patent Publication Nos. 7896/1972 and 9111/1974 and U.S. Pat. No. 3,759,888).

For example, the above-cited U.S. Pat. No. 3,759,888 discloses a process for the preparation of chlorinated polyethylene by multi-stage chlorination of polyethylene in an aqueous suspension system, which comprises (a) chlorinating polyethylene powder in a first stage chlorination at a temperature 5°–50° C. below the crystalline melting point of said polyethylene, under introduction of chlorine, to a chlorine content of from 10–45% by weight, in a manner so as to avoid complete melting and disappearance of the crystalline portion of said polyethylene, (b) heat-treating the first stage-chlorinated polyethylene under interruption of chlorine introduction, at a temperature ($T_b$) above the lower critical melting temperature of the crystalline portion of the first stage-chlorinated polyethylene and at least 5° C. above the first stage-chlorination temperature, the heat treatment being carried out so that the chlorine content after heat treatment and before further chlorination is less than 1% higher than the chlorine content after chlorination step (a); and (c) thereafter further chlorinating the heat-treated chlorinated polyethylene under resumption of chlorine introduction in a second stage chlorination, at a temperature ($T_c$) below heat-treating temperature ($T_b$) and 10° to 60° C. lower than the crystalline melting point of the starting polyethylene, until a final chlorine content of 20 to 25% by weight is reached, said final chlorine content being at least 1% by weight higher than the chlorine content after chlorination step (a).

The U.S. Patent document states that the starting ethylene polymer may contain not more than 20 mole %, preferably not more than 10 mole %, of a comonomer component. Butene-1 is shown as one example of the comonomer component, but the U.S. Patent fails to give any working example in which such a copolymer of ethylene and butene-1 was actually used. It is essential in this patent that the chlorinating temperature in the third step should be at least 10° C. (10°–60°) lower than the DSC crystalline melting point of the starting ethylene polymer.

Japanese Laid-Open Patent Publication No. 23802/1983 (laid-open on Feb. 12, 1983 which is after the priority date of the present application; corresponding to U.S. patent application Ser. No. 289,821) discloses a chlorinated rubber having a chlorine content of about 5 to about 50% by weight and a Mooney viscosity ($ML_{1+4, 100° C.}$) of about 20 to about 150 obtained by chlorinating an ethylene/1-butene copolymer in which the mole ratio of ethylene to 1-butene is about 85/15 to about 95/5, and a process for its production. This Japanese patent document gives a description of a chlorinated rubber obtained by after-chlorinating an ethylene/butene-1 copolymer having an ethylene content of 74 to 90.5% by weight and a butene-1 content of 26 to 9.5% by weight. Although it gives no specific experimental example, it states that when the ethylene content exceeds about 95 mole %, i.e. about 90.5% by weight, or in other words, the content of butene-1 is less than 9.5% by weight, the rubbery properties of the product will undesirably be inferior. This patent document does not at all refer to after-chlorination in multiple stages.

The main uses of the after-chlorinated ethylene polymers are for improving the impact strength of vinyl chloride resins, imparting fire retardancy to various synthetic resins and for insulating coating of electrical wires and cables. In recent years, by utilizing their excellent pliability, weatherability, oil resistance, etc., they have also found increasing applications in hoses, sheets, packings, gaskets, extrusion molded articles, etc.

The after-chlorinated ethylene polymers now in main use still show some resin-like properties and have various efects when viewed from the standpoint of elastomers. For example, since they have too high hardness, too large 100% moduli, or poor low temperature properties, they are suitable only as relatively hard rubber products. Addition of a large amount of a plasticizer, etc. in an attempt to remove this limitation results in stickiness on the surface of the product, or in soiling owing to bleed out of the plasticizer. In addition, the large amount of the plasticizer unduly aggravates the desirable fire-retarding properties of the chlorinated ethylene polymers.

On the other hand, in a heterogeneous reaction by chlorination in an aqueous suspension system, there is a tendency to the formation of an after-chlorinated olefin polymer having inferior rubbery elasticity and pliability to an after-chlorinated olefin polymer obtained in a homogeneous reaction. Hence, attempts were made to achieve improvements by considering the melting point of the starting olefin polymer and selecting the reaction temperature. Specifically, attempts were made to improve rubbery elasticity, pliability, etc. by after-chlorinating the starting olefin polymer at a temperature near the crystalline melting point of the polymer or at a higher temperature. Such a technique, however, results in agglomeration of slurry particles, and it is difficult or impossible to control the chlorination reaction. Or after-treatments such as washing and drying become difficult, and it is virtually impossible to obtain a satisfactory chlorinated olefin polymer.

Conventional after-chlorinated ethylene polymers have poor adhesion to an ethylene/propylene/diene rubber (EPDM). For example, when it is desired to produce a laminated structure composed of an inner layer of EPDM and an outer layer of the after-chlorinated ethylene polymer, such as hoses for city gas services, and hoses for automobile radiators, by bonding the after-chlorinated ethylene polymer layer having excellent weatherability, oil resistance and heat resistance to the EPDM layer by vulcanization, satisfactory adhesion strength cannot be obtained.

The present inventors have made investigations in order to provide a chlorinated ethylene polymer which can overcome these troubles, and consequently found that by a multi-stage aqueous suspension polymerization technique which meets a combination of specified process conditions and uses a specified ethylene/butene-1 copolymer, the aforesaid troubles can be overcome, and an after-chlorinated ethylene copolymer having excellent cold resistance and a fine particle size, for example an average particle size of not more than 0.1 mm, can be provided without agglomeration.

Investigations of the present inventors show that an after-chlorinated ethylene/butene-1 copolymer having the characteristics (a) to (e) described above, which is not described in the prior literature can be obtained; that this chlorinated ethylene/butene-1 copolymer has excellent properties both at room temperature and low temperatures shown by (f) a 100% modulus at room temperature of not more than 10 kg/cm² and (g) a 25% modulus at −20° C. of not more than 100 kg/cm²; that it has a 100% modulus (to be abbreviated as $M_{100}$ hereinafter) by a tensile test in accordance with JIS-K-6301, which is an important property of an elastomer, and a hardness both much lower than conventional chlorinated ethylene polymers; and that the copolymer has a very high elongation at break and excellent cold resistance.

It has also been found that the after-chlorinated ethylene/butene-1 copolymer of this invention has excellent adhesion to EPDM by vulcanization and can provide a laminated structure having a satisfactory vulcanization adhesion strength.

It is known that a chlorinated product of high-density polyethylene which is chlorinated in an aqueous suspension system under conditions which impart most rubbery properties shows the disappearance of the crystals of the starting polyethylene and minima of its hardness and 100% modulus and a maximum of its elongation, when its chlorine content is about 35% by weight. Generally, in order to impart excellent rubbery properties at room temperature, the chlorine content must be increased. It has been known on the other hand that with regard to the chlorinated product of high-density polyethylene obtained by the aqueous suspension method, the increased chlorine content markedly impairs the rubbery properties at low temperatures. It has now been found surprisingly in accordance with this invention that in an after-chlorinated ethylene copolymer having the characteristics (a) to (d), the crystals of the starting copolymer disappear when the chlorine content is about 30% by weight, and minimum values of hardness and $M_{100}$ and a maximum value of elongation exist; and that an after-chlorinated ethylene copolymer having excellent rubbery properties at room temperature and retaining these rubbery properties even at low temperatures can be provided.

It has also been found that an after-chlorinated ethylene copolymer having the aforesaid excellent improved properties can be produced by a process which comprises a first step of chlorinating an ethylene polymer in aqueous suspension at a temperature at least 5° C. lower than the crystalline melting point determined by differential scanning calorimetry of the polymer while feeding chlorine gas, a second step of heat-treating the chlorinated ethylene polymer at a temperature higher than the crystalline melting point determined by differential scanning calorimetry of the chlorinated ethylene polymer and at least 5° C. higher than the chlorinating temperature in the first step in the substantial absence of chlorine gas without feeding chlorine gas, and chlorinating the resulting heat-treated chlorinated ethylene polymer in aqueous suspension at a temperature lower than the crystalline melting point of the starting polymer determined by differential scanning calorimetry and equal to, or lower than, the temperature in the second step with the feeding of chlorine gas until the final chlorine content is reached; characterized in that (a) in the first step, an ethylene-butene-1 copolymer having a density of 0.915 to 0.930, an ethyl content of 93 to 97% by weight, a butene-1 content of 7 to 3% by weight and a crystalline melting point, determined by differential scanning calorimetry, of 115° to 125° C. (i.e., having a considerably broad crystalline melting point range), at least a part of said copolymer being a crystalline linear ethylene copolymer, and at least 30% by weight of said crystalline portion being meltable at a temperature of not more than 110° C., is chlorinated at a temperature of 100° to 115° C. in aqueous suspension until its chlorine content reaches 10 to 20%, (b) the second step is carried out at a temperature at least 5° C. higher than the temperature of the first step and not higher than the crystalline melting point, determined by differential scanning calorimetry, of the starting ethylene/butene-1 copolymer, and (c) the third step is carried out at a temperature 6±2° C. lower than the crystalline melting point, determined by differential scanning calorimetry, of the starting ethylene/butene-1 copolymer (which temperature condition differs from that which is essential in the above-cited U.S. Pat. No. 3,759,888, namely a temperature 10° to 60° C. lower than the crystalline melting point determined by differential scanning calorimetry of the starting ethylene polymer) until the chlorine content of the final product reaches 25 to 35% by weight.

Investigations of the present inventors also show that in the case of an ordinary low-pressure or high-pressure polyethylene having a relatively narrow crystalline melting point range or an ethylene/α-olefin copolymer having a relatively narrow crystalline melting point range, a chlorinated ethylene polymer having rubbery properties and free from residual crystals can be formed without undesirable agglomeration by starting chlorination in an aqueous suspension system at a temperature of about 100° C. and terminating the chlorination at a temperature near the crystalline melting point of the starting polymer or copolymer, but that when this technique is applied to an ethylene/butene-1 copolymer having a considerably broad crystalline melting point range specified in requirement (a) of the present invention, undesirable agglomeration occurs and satisfactory results cannot be obtained. It has now been found in accordance with this invention that by chlorinating the ethylene/butene-1 copolymer specified in requirement (a) under the conditions (a), (b) and (c), an after-chlorinated ethylene copolymer having excellent rubbery properties at low temperatures and being free from residual crystals (represented by a heat of fusion of its crystalline portion, determined by differential scanning calorimetry, of not more than 0.5 cal/g) can be produced, without agglomeration, in the form of fine particles having an average particle size of, for example, not more than 0.1 mm.

It is an object of this invention therefore to provide an after-chlorinated ethylene/butene-1 copolymer which is not described in the prior literature and has excellent rubbery properties both at room temperature and low temperatures.

Another object of this invention is to provide a process for producing the aforesaid after-chlorinated ethylene/butene-1 copolymer.

The above and other objects and advantages of this invention will become apparent from the following description.

The after-chlorinated ethylene/butene-1 copolymer has 1 to 2 methyl groups per 100 carbon atoms [characteristic (a)].

The number of methyl groups per 100 carbon atoms is measured by the following method.

Sample preparation

One gram of the after-chlorinated ethylene copolymer was dissolved in 3 ml of o-dichlorobenzene, 0.6 ml of deuterobenzene and 0.2 ml of hexamethyldisiloxane (HMDS for short) to prepare a sample.

Measuring conditions

Instrument: FX-90Q (manufactured by JEOL LTD., Japan)
Pulse series: Single pulse, 6 μsec., 45°, repeating time 2 sec, complete proton decoupling, more than 30,000 pulses.
Temperature: 100° C.

Calculation of the methyl group content

In the chart obtained, the heights of all of the peaks attributed to the carbon atoms of the after-chlorinated ethylene copolymer were totalled, and the total was divided by the height of a peak at 9±1 ppm based on HMDS. The quotient was then multiplied by 100, and the result was defined as the methyl group content (per 100 carbon atoms). The peak at 9±1 ppm was a peak attributed only to the ethyl branching in the after-chlorinated ethylene copolymer.

The number of methyl groups in the after-chlorinated ethylene/butene-1 copolymer of the invention determined as above is 1 to 2 per 100 carbon atoms, which is a considerably larger value than any conventional after-chlorinated polyethylene. This property has a bearing on the fact that the after-chlorinated ethylene copolymer of the invention is free from the crystals of the starting copolymer despite its low chlorine content and has excellent rubbery properties both at room temperature and low temperatures, and consequently, it has much lower $M_{100}$ and hardness than the conventional chlorinated ethylene polymers, a very high elongation at break and excellent cold resistance.

The after-chlorinated ethylene/butene-1 copolymer of this invention has a chlorine content of 25 to 35% by weight, preferably 30±3% by weight [characteristic (b)].

The chlorine content in this invention is a value measured by elemental analysis. The chlorine content of about 30% is lower than a chlorine content of about 35% by weight at which the crystals of the starting polyethylene substantially disappear in conventional after-chlorinated polyethylenes. Accordingly, in the after-chlorinated ethylene/butene-1 copolymer of this invention, the crystals of the starting copolymer disappear at a lower chlorine content, and it has excellent rubbery properties both at room temperature and low temperatures.

The after-chlorinated ethylene/butene-1 copolymer of this invention has a weight average molecular weight of not less than 100,000, for example about 100,000 to about 500,000 [characteristic (c)].

The weight average molecular weight in this invention is a weight average molecular weight based on polystyrene measured at 135° C. by gel-permeation chromatography for a 0.1% by weight solution of the copolymer in 1,2,4-trichlorobenzene solvent. The detector used in the measurement is a differential refractometer. If the weight average molecular weight is less than 100,000, the properties of a vulcanizate obtained from the after-chlorinated copolymer of the invention tends to be aggravated.

The after-chlorinated ethylene/butene-1 copolymer has a heat of fusion, determined by differential scanning calorimetry (DSC for short), of not more than 0.5 cal/g [characteristic (d)].

The DSC heat of fusion in this invention is a value measured at a temperature elevation rate of 10° C./min. by using a differential calorimeter (Model DSC-1B, manufactured by Perkin Elmer Company).

The after-chlorinated ethylene/butene-1 copolymer of this invention has a heat of fusion, determined by DSC as above, of 0 to 0.5 cal/g. This means that the crystals in the starting ethylene/butene-1 copolymer have substantially disappeared. In combination with the aforesaid parameters (a), (b) and (c) described above, this parameter (d) has a bearing on the fact that the after-chlorinated copolymer of this invention exhibits excellent rubbery properties both at room temperature and low temperatures.

The after-chlorinated ethylene/butene-1 copolymer of this invention does not virtually show a peak at $2\theta = 30°$ in its diffraction curve obtained by X-ray broad angle diffraction. Cu-Kα radiation (wavelength 1.54 A) is used as a source of X-rays, and the diffraction curve obtained is plotted against the Bragg's angle $2\theta$.

The after-chlorinated ethylene/butene-1 copolymer of this invention has an ethylene content of 93 to 97% by weight, and a butene-1 content of 7 to 3% by weight [characteristic (e)]. When the butene-1 content is less than the above-specified lower limit, the chlorine content must be increased in order to cause disappearance of the crystals of the starting copolymer. As a result, the rubbery properties at low temperatures of the resulting affter-chlorinated copolymer will be deteriorated. If the butene-1 content exceeds the specified upper limit, the pliability or heat resistance of a vulcanizate obtained from the after-chlorinated ethylene/butene-1 copolymer tends to be deteriorated.

In addition to the above characteristics (a) to (e), the after-chlorinated ethylene/butene-1 copolymer of this invention usually has a 100% modulus at room temperature of not more than 10 kg/cm$^2$, for example 5 to 10 kg/cm$^2$ [characteristic (f)], and a 25% modulus at $-20°$ C. of not more than 100 kg/cm$^2$, for example 40 to 100 kg/cm$^2$ [characteristic (g)].

The modulus of the after-chlorinated copolymer of this invention is measured in accordance with JIS-K6301 using a 2 mm press sheet of the after-chlorinated copolymer prepared by sheeting it on an 8-inch roll and press-forming it at 100° C. and 100 kg/cm$^2$.

The first step of the after-chlorinated ethylene copolymer of this invention is carried out by chlorinating in aqueous suspension an ethylene/butene-1 copolymer having a density of 0.915 to 0.930, and ethylene content of 93 to 97% by weight, a butene-1 content of 7 to 3% by weight and a crystalline melting point determined by DSC [the temperature showing the highest peak among the entire crystal peaks of the DSC chart measured in the same way as described above with regard to (d)] of 115° to 125° C., at least a part of the copolymer being a crystalline linear ethylene copolymer and at least 30% by weight of the crystalline portion being meltable at not more than 110° C., at a temperature of 100° to 115° C. with feeding of chlorine gas until the chlorine content of the copolymer reaches 10 to 20%.

The starting ethylene/butene-1 copolymer can be produced by methods known per se (for example, see Japanese Laid-Open Patent Publication No. 106910/1981) or are available from the market.

Preferably, the amount of the crystalline portion of the linear ethylene copolymer is in the range of 10 to 20 cal/g (the total crystal peak area in the DES chart) in terms of heat of fusion determined by DSC in the same way as described above with regard to (d).

That at least 30% by weight of the crystalline portion is meltable at not more than 110° C. means the following.

$$\frac{\text{Area of crystal peaks at 110° C. or less in the DSC chart}}{\text{Area of entire crystal peaks in the DSC chart}} \times 100 \leq 30$$

The technique of chlorination in aqueous suspension is well known, and for example, the technique disclosed in U.S. Pat. No. 3,759,888 can be used.

In the second step, the chlorinated ethylene/butene-1 copolymer obtained as above in the first step is heat-treated in the substantial absence of chlorine gas without feeding chlorine gas at a temperature at least 5° C. higher than the first step and not higher than the DSC crystalline melting point [the temperature showing the highest peak among all of the peaks in the DSC chart measured in the same way as described in (d) above] of the starting ethylene/butene-1 copolymer. The technique of heat-treatment in the substantial absence of chlorine gas is well known, and for example, the technique disclosed in U.S. Pat. No. 3,769,888 cited above can be utilized.

In the third step, the heat-treated product is chlorinated in aqueous suspension at a temperature 6±2° C. lower than the DSC crystalline melting point of the starting ethylene/butene-1 copolymer with feeding of chlorine gas until the chlorine content of the final product reaches 25 to 35% by weight. The temperature used in the third step is of course lower than the temperature of the second step. The third step can be carried out by the same technique as disclosed in the above-cited U.S. Pat. No. 3,759,888 except that the temperature is 6±2° C. lower than the DSC melting point of the starting ethylene/butene-1 copolymer (in the U.S. Pat. No. 3,759,888, the use of a temperature 10° to 60° C. lower than the DSC crystalline melting point of the starting ethylene polymer is essential).

According to the process of this invention, an after-chlorinated ethylene/butene-1 copolymer having the characteristics (a) to (e) and further the excellent properties (f) and (g) can be produced in the form of particles having a desirable particle size, for example an average particle size of not more than 0.1 mm, without the trouble of agglomeration. The after-chlorinated copolymer exhibits excellent rubbery properties both at room temperature and low temperatures.

A vulcanized product of the after-chlorinated ethylene/butene-1 copolymer of this invention can be produced by mixing the after-chlorinated copolymer with suitably selected rubber compounding chemicals such as a vulcanizing agent, a vulcanization accelerator, an acid acceptor, a filler, a coloring agent, an antioxidant, a stabilizer, a plasticizer and a processing aid to form a curable rubber composition, and curing the composition in a customary manner. The after-chlorinated ethylene/butene-1 copolymer of this invention can also be utilized as a component to be blended with another after-chlorinated ethylene polymer or copolymer.

The amounts of the various rubber compounding chemicals can be properly chosen. For example, per 100 parts by weight of the after-chlorinated ethylene/butene-1 copolymer, the amounts are about 0.1 to about 5 parts by weight for the vulcanizer, about 0.1 to about 5 parts by weight for the vulcanization accelerator, about 1 to about 20 parts by weight for the acid acceptor, up to about 200 parts by weight for the filler, up to about 20 parts by weight for the coloring agent, up to about 5 parts by weight for the antioxidant, up to about 100 parts by weight for the plasticizer, and up to about 5 parts by weight for the processing aid.

Specific examples of the vulcanizing agents include peroxide vulcanizers such as dicumyl peroxide, 2,5-dimethyl-2,5-di(tert.-butylperoxy)hexane, 2,5-dimethyl-2,5-di(benzoylperoxy)hexane, 2,5-dimethyl-2,5-di(tert.butylperoxy)hexyne-3, di-tert.butyl peroxide, di-tert.butylperoxy-3,3,5-trimethylcyclohexane and tert.butyl hydroperoxide(dicumyl peroxide, di-tert.butyl peroxide, and di-tert.butylperoxy-3,3,5-trimethylcyclohexane are preferred); triazine vulcanizers such as 1,3,5-trithiocyanuric acid, 1-methoxy-3,5-dimercaptotriazine, 1-hexylamino-3,5-dimercaptotriazine, 1-diethylamino-3,5-dimercaptotriazine, 1-dibutylamino-3,5-dimercaptotriazine, 1-cyclohexylamino-3,5-dimercaptotriazine and 1-phenylamino-3,5-dimercaptotriazine; thiourea vulcanizers such as thiourea, ethylenethiourea, monomethylthiourea and diethylthiourea; and amine vulcanizers such as hexamethylenediamine carbamate, ethylenediamine carbamate, and N,N'-dicinnamylidene-1,6-hexanediamine.

When vulcanization is carried out by using electron beams without using a vulcanizer, electron beams having an energy of about 0.1 to 10 MeV, preferably about 0.3 to about 20 MeV, are irradiated on the curable rubber composition so that the dose absorbed reaches about 0.5 to about 35 Mrad, preferably about 0.5 to about 10 Mrad.

Examples of vulcanization accelerators for the aforesaid peroxide vulcanizers include sulfur, quinonedioxime compounds such as p-quinonedioxime, methacrylate compounds such as polyethylene glycol dimethacrylate, allyl compounds such as diallyl phthalate and triallyl cyanurate, maleimide compounds and divinylbenzene.

Examples of vulcanization accelerators for the triazine vulcanizers are thiuramsulfides or dithiocarbamate salts. Specific examples include tetramethylthiuram monosulfide, tetramethylthiuram disulfide, tetraethylthiuram disulfide, tetrabutylthiuram monosulfide, tetrabutylthiuram disulfide, N,N'-dimethyl-N,N'-diphenylthiram disulfide, dipentamethylenethiuram monosulfide, dipentamethylenethiuram disulfide, dipentamethylenethiuram tetrasulfide, dipentamethylenethiuram hexasulfide, sodium dimethyldithiocarbamate, sodium diethyldithiocarbamate, sodium di-n-butyldithiocarbamate, potassium dimethyldithiocarbamate, potassium di-n-butyldithiocarbamate, lead dimethyldithiocarbamate, lead pentamethylenedithiocarbamate, lead ethylphenyldithiocarbamate, zinc dimethyldithiocarbamate, zinc diethyldithiocarbamate, zinc di-n-butyldithiocarbamate, zinc dibenzyldithiocarbamate, zinc N-pentamethylenedithiocarbamate, zinc ethylphenyldithiocarbamate, selenium dimethyldithiocarbamate, selenium diethyldithiocarbamate, tellurium diethyldithiocarbamate, cadmium diethyldithiocarbamate, cadmium pentamethylenedithiocarbamate, copper dimethyldithiocarbamate, iron dimethyldithiocarbamate, bismuth dimethyldithiocarbamate, dimethyl ammonium dimethyldithiocarbamate, dibutyl ammonium dibutyldithiocarbamate, diethyl ammonium diethyldithiocarbamate, N,N-dimethylcyclohexamine dibutyldithiocarbamate, piperidine pentamethylenedithiocarbamate, and pipecoline methylpentamethylenedithiocarbamate.

The acid acceptor may include the oxides, hydroxide, carbonates, carboxylates, silicates, borates and phosphites of metals of Group II of the periodic table, and the oxides, basic carbonates, basic carboxylates, basic phosphites, basic sulfites and tribasic sulfates of metals of Group IVa of the periodic table. Specific examples are magnesia, magnesium hydroxide, barium hydroxide, magnesium carbonate, barium carbonate, quick lime, slaked line, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, dibasic lead phosphite, basic tin phosphite, basic lead sulfite and tribasic lead sulfate.

Examples of the filler include various carbon blacks, magnesium carbonate, calcium carbonate, aluminum silicate, hydrous magnesium silicate, silicon dioxide, diatomaceous earth, aluminum sulfate, barium sulfate and calcium sulfate.

Examples of the coloring agent include inorganic coloring agents such as titanium oxide, carbon blacks, red iron oxide, titanium yellow, cobalt green, ultramarine, and manganese violet, and organic coloring agents such as azo pigments, nitroso pigments, nitro pigments and phthalocyanine pigments.

Examples of the antioxidant include metal soaps such as calcium stearate or barium stearate, inorganic acid salts such as tribasic lead sulfate, organic tin compounds such as dibutyltin dilaurate, a polymer of 2,2,4-trimethyl-1,2-dihydroquinoline, 2,6-di-tert-butyl-4-methylphenol, 4,4'-thiobis-(6-tert-butyl-3-methylphenol, and 2-mercaptobenzimidazole.

Examples of the fire retardant include such inorganic compounds as antimonyl oxide and aluminum hydroxide, and phosphoric esters such as tris(chloroethyl) phosphate.

Examples of the plasticizer include trimellitic acid derivatives such as trioctyl trimellitate, phthalic acid derivatives such as di-(2-ethylhexyl)phthalate, aliphatic dibasic acid derivatives such as di-(2-ethylhexyl)adipate, azelate or sebacate, phosphoric acid derivatives such as tributyl phosphate, epoxy derivatives such as epoxidized soybean oil, paraffin derivatives such as chlorinated paraffin, paraffinic process oils, naphthenic process oils and aromatic process oils.

The after-chlorinated ethylene/butene-1 copolymer of this invention is compounded with the various compounding chemicals exemplified above by any desired means utilized heretofore in the processing of rubbers, for example by using a mixing roll, a Banbury mixer, various types of kneaders, etc. The rubber compound is molded into a predetermined shape by an extruder, a calender roll, a press, etc.

The curable rubber composition so prepared containing the after-chlorinated ethylene/butene-1 copolymer as a rubber component can be vulcanized by methods known per se. For example, it is heated usually at a temperature of 120° to 200° C. to form a vulcanized product. The vulcanization reaction time differs with the temperature, but is usually between 0.5 minute and 60 minutes. Vulcanization-molding can be performed by utilizing any desired means, for example by using press molding, injection molding, a steam can, an air bath, or by heating with infrared rays or microwaves.

The curable rubber composition containing the after-chlorinated ethylene/butene-1 copolymer as a rubber component may be vulcanized and bonded with a curable rubber composition containing another olefin rubber such as an ethylene/propylene/diene terpolymer rubber as a rubber component to form a cured laminated structure. The vulcanization may be effected, for example, by molding the two composition into a laminate tube by a twin-screw extruder and then vulcanizing the laminate tube, or by bonding the curable compositions to each other and then press-vulcanizing the assembly.

An adhesive for culcanized rubbers may be prepared by dissolving the after-chlorinated ethylene/butene-1 copolymer rubber composition in a solvent such as toluene.

The following examples illustrate the present invention in greater detail.

EXAMPLES 1 TO 4 AND COOMPARATIVE EXAMPLES 1 TO 3

A 100-liter autoclave was charged with 5 kg of a powder of an ethylene/butene-1 copolymer (density 0.920; MI=0.8; butene content 4.8%; DSC crystalline melting point 120° C.; containing 47.5% of a crystalline portion melting at 110° C. or below) having a size smaller than 40 mesh together with 70 liters of deionized water, 2 g of a wetting agent and 200 ml of a dispersing agent. In a first step, the copolymer was chlorinated to a chlorine content of 20% by weight. Then, chlorine gas was driven off, and while the feeding of chlorine was suspended, the chlorinated copolymer was heat-treated for 1 hour in a second step. In a third step, the heat-treated product was chlorinated to a final chlorine content of 32% by weight. The final product was washed with water and dried in a customary manner. The properties of the after-chlorinated ethylene copolymer and the temperature conditions are summarized in Table 1.

TABLE 1

| | Chlorinating conditions | | | | Average particle diameter (mm) | Tensile properties (*1) | | | Hardness (TISA) (*2) |
|---|---|---|---|---|---|---|---|---|---|
| | | | | | | $M_{100}$ | $T_B$ | $E_B$ | |
| Example 1 | 120° C. | | | | 0.01 | 6 | 30 | 1800 | 43 |
| | $\frac{115° C.}{20\%}$ | | $\frac{115° C.}{32\%}$ | | | | | | |
| Example 2 | 120° C. | | | | 0.01 | 7 | 60 | 1500 | 46 |
| | $\frac{110° C.}{20\%}$ | | $\frac{115° C.}{32\%}$ | | | | | | |
| Example 3 | 118° C. | | | | 0.01 | 7 | 60 | 1500 | 46 |
| | $\frac{110° C.}{20\%}$ | | $\frac{116° C.}{32\%}$ | | | | | | |
| Example 4 | 120° C. | | | | 0.01 | 9 | 80 | 1200 | 48 |
| | $\frac{115° C.}{20\%}$ | | $\frac{112° C.}{32\%}$ | | | | | | |
| Comparative Example 1 | 120° C. | | | | 0.1 | 12 | 90 | 1000 | 56 |
| | $\frac{95° C.}{20\%}$ | | $\frac{115° C.}{32\%}$ | | | | | | |
| Comparative Example 2 | 120° C. | | | | 0.01 | 12 | 100 | 900 | 56 |
| | $\frac{115° C.}{20\%}$ | | $\frac{110° C.}{32\%}$ | | | | | | |
| Comparative Example 3 | 120° C. | | | | 0.01 | 14 | 110 | 800 | 60 |
| | $\frac{115° C.}{20\%}$ | | $\frac{110° C.}{32\%}$ | | | | | | |

| | Methyl group content per 100 carbons (a) | Cl content (b) | Weight average molecular weight ($\times 10^5$) (c) | Heat of fusion by DSC (cal/g) (d) | Butene-1 contact (wt. %) (e) | $-20°$ C. $M_{25}$ ($kg/cm^2$) |
|---|---|---|---|---|---|---|
| Example 1 | 1 | 32 | 2 | 0 | 4.8 | 95 |

TABLE 1-continued

| | | | | | | |
|---|---|---|---|---|---|---|
| Example 2 | 1 | " | " | 0.2 | " | 96 |
| Example 3 | 1 | " | " | 0.1 | " | 96 |
| Example 4 | 1 | " | " | 0.3 | " | 98 |
| Comparative Example 1 | 1 | " | " | 1 | " | 120 |
| Comparative Example 2 | 1 | " | " | 1 | " | 115 |
| Comparative Example 3 | 1 | " | " | 3 | " | 130 |

(*1) and (*2): Based on JIS K-6301.

EXAMPLE 5

Example 1 was repeated except that the chlorine content of the copolymer at the end of the first step and the chlorine content of the final product were changed to 15 and 26% by weight, respectively.

EXAMPLE 6

Example 1 was repeated except that the chlorine content of the final product was changed to 34% by weight.

EXAMPLE 7

Example 1 was repeated by using the same ethylene/butene-1 copolymer as in Example 1 except it contained 41.5% of a crystalline portion melting at 110° C. or below and had an MI or 0.3.

COMPARATIVE EXAMPLES 4 TO 7

Using an ethylene/4-methylpentene-1 copolymer (density 0.92; MI=2.0; crystalline melting point 122° C.; containing 22.2% of a portion melting at 110° C. or below; tradename "Ultrzex"), chlorination was carried out at 105° C. until the chlorine content reached 10%. Thereafter, the chlorination is carried out at 120° C. Chlorinated products having an average particle diameter of 0.02 mm and a final chlorine content of 25, 31, 35 and 41% by weight, respectively, were thus produced.

COMPARATIVE EXAMPLES 8 AND 9

Chlorinated polyethylenes commercially available under "H-135" and "MR-104" (products of Osaka Soda Co., Ltd.) having a chlorine content of 35 and 40% by weight respectively were obtained as comparisons.

COMPARATIVE EXAMPLE 10

Using high-density polyethylene (density 0.955; MI=0.04; crystalline melting point 132° C.) synthesized by the Ziegler method, chlorination was carried out at 110° C. until the chlorine content reached 25% by weight. Therafter, the chlorination was carried out at 140° C. Chlorinated polyethylene having a chlorine content of 40% by weight and an average particle diameter of 2 mm was obtained.

COMPARATIVE EXAMPLES 11 AND 12

The ethylene/4-methylpentene-1 copolymer used in Comparative Examples 7 to 10 [Comparative Example 11], or the high-density polyethylene used in Comparative Example 8 [Comparative Example 13] was chlorinated in a first step at a temperature 5° C. lower than the crystalline melting point of the starting polymer until its chlorine content reached 20% by weight. Then, at the crystalline melting point of the starting polymer, the chlorinated product was heat-treated for 1 hour. Then, again at the temperature used in the first step, the heat-treated product was chlorinated until the chlorine content reached 30% by weight (Comparative Example 11) or 35% by weight (Comparative Example 12). The final products had an average particle diameter of 0.01 mm.

EXAMPLE 8

Example 1 was repeated except that a powder of an ethylene/butene-1 copolymer (density 0.915; MI=0.8; butene-1 content 6.5% by weight; crystalline melting point 118° C.; containing 51.3% by weight of a crystalline portion melting at 110° C. or below) was used as the starting material.

EXAMPLE 9

Example 1 was repeated except that an ethylene/butene-1 copolymer (density 0.930; MI=0.8; butene-1 content 3.5% by weight; crystalline melting point 123° C.; containing 34.0% of a crystaline portion melting at 110° C. or below) was used as the starting material.

COMPARATIVE EXAMPLE 13

Using an ethylene/butene-1 copolymer (density 0.940; MI=0.2; butene-1 content 1% by weight; crystalline melting point 127° C.; containing 15.2% of a crystalline portion melting at 110° C. or below), chlorination was carried out at 105° C. until the chlorine content reached 20% by weight. Thereafter the chlorination was carried out at 125° C.

COMPARATIVE EXAMPLE 14

Example 1 was repeated except that an ethylene/butene-1 copolymer (density 0.905; MI=1.0; butene-1 content 10% by weight; crystalline melting point 115° C.; containing 62.0% of a crystalline portion melting at 110° C. or below) was used as the starting material. A chlorinated ethylene/butene-1 copolymer having a chlorine content of 32% by weight was obtained. But with the progress of chlorination, the reaction slurry became agglomerated, and after the reaction, the reaction mixture was difficult to wash.

COMPARATIVE EXAMPLE 15

Example 1 was repeated except that using the ethylene/butene-1 used in Comparative Example 14, chlorination was carried out at 80° to 83° C.

Table 2 summarizes the properties of the chlorinated polymers obtained in Examples 1 and 5 to 9 and Comparative Examples 4 to 15.

татBLE 2

| Example (Ex.) or Comparative | Properties of the starting materials | | | Proportion of crystals melting |
|---|---|---|---|---|
| | Density | Crystalline | Heat of fusion | |

TABLE 2-continued

| Example (CEx.) | Type | (g/cc) | MI | melting point | (cal/g) | at 110° C. or below |
|---|---|---|---|---|---|---|
| Ex. 5 | Ethylene-butene-1 copolymer | 0.920 | 0.8 | 120 | 15 | 47.5 |
| Ex. 1 | " | 0.920 | 0.8 | 120 | 15 | 47.5 |
| Ex. 6 | " | 0.920 | 0.8 | 120 | 15 | 47.5 |
| Ex. 7 | " | 0.920 | 0.8 | 120 | 15 | 41.5 |
| CEx. 4 | Ethylene/4-methylpentene-1 copolymer | 0.920 | 2.0 | 122 | 19 | 22.2 |
| CEx. 5 | " | 0.920 | 2.0 | 122 | 19 | 22.2 |
| CEx. 6 | " | 0.920 | 2.0 | 122 | 19 | 22.2 |
| CEx. 7 | " | 0.920 | 2.0 | 122 | 19 | 22.2 |
| CEx. 8 | High-density polyethylene | 0.955 | 0.04 | 132 | 39 | below 10% |
| CEx. 9 | " | 0.955 | 0.04 | 132 | 39 | " |
| CEx. 10 | " | 0.955 | 0.04 | 132 | 39 | " |
| CEx. 11 | Ethylene/4-methylpentene copolymer | 0.920 | 2.0 | 122 | 19 | 22.2 |
| CEx. 12 | High-density polyethylene | 0.955 | 0.04 | 132 | 39 | below 10% |
| Ex. 8 | Ethylene/butene copolymer | 0.915 | 0.8 | 118 | 13 | 51.3 |
| Ex. 9 | " | 0.930 | 0.8 | 123 | 23 | 34.0 |
| CEx. 13 | " | 0.940 | 0.2 | 127 | 29 | 15.2 |
| CEx. 14 | " | 0.905 | 1.0 | 115 | 10 | 62.0 |
| CEx. 15 | " | " | " | " | " | " |

| | Properties of the chlorinated product | | | | | | | | | | |
|---|---|---|---|---|---|---|---|---|---|---|---|
| Example (Ex.) or Comparative Example (CEx.) | Methyl group content per 100 carbons (a) | Chlorine content in % by weight (b) | Heat of fusion by DSC (cal/g) (d) | Butene-1 content in % by weight (e) | Average weight molecular weight (× 10$^4$) | Average particle diameter (cm) | Tensile properties at room temperature | | | H$_s$ (JIS-A) | M$_{25}$ at 20° C. |
| | | | | | | | M$_{100}$ (kg/cm$^2$) | T$_B$ (kg/cm$^2$) | E$_B$ (%) | | |
| Ex. 5 | 1.5 | 26 | 0 | 4.8 | 18 | 0.01 | 9 | 70 | 1400 | 49 | 46 |
| Ex. 1 | 1 | 32 | 0 | " | 20 | 0.01 | 6 | 30 | 1800 | 43 | 90 |
| Ex. 6 | 1 | 34 | 0 | " | 21 | 0.01 | 9 | 80 | 1200 | 49 | 95 |
| Ex. 7 | 1 | 30 | 0 | " | 25 | 0.01 | 7 | 60 | 1500 | 46 | 90 |
| CEx. 4 | 0 | 26 | 0 | — | 18 | 0.01 | 17 | 80 | 1200 | 69 | — |
| CEx. 5 | 0 | 31 | 0 | — | 18 | 0.01 | 13 | 70 | 1500 | 68 | — |
| CEx. 6 | 0 | 35 | 0 | — | 19 | 0.01 | 12 | 45 | 1600 | 65 | — |
| CEx. 7 | 0 | 41 | 0 | — | 21 | 0.01 | 26 | 50 | 1000 | 75 | — |
| CEx. 8 | 0.2 | 35 | 0 | 0.5 | 32 | 0.01 | 19 | 160 | 600 | 67 | — |
| CEx. 9 | 0 | 40 | 0 | " | 34 | 0.01 | 10 | 100 | 700 | 58 | 161 |
| CEx. 10 | 0 | 40 | 0 | " | 36 | 0.2 | 8 | 90 | 680 | 55 | 200 |
| CEx. 11 | 0 | 30 | 2 | — | 18 | 0.01 | 16 | 90 | 900 | 71 | — |
| CEx. 12 | 0 | 35 | 4 | 0.5 | 34 | 0.01 | 20 | 170 | 500 | 68 | — |
| Ex. 8 | 1.8 | 31 | 0 | 6.5 | 20 | 0.01 | 6 | 25 | 1900 | 42 | 80 |
| Ex. 9 | 1 | 30 | 0 | 3.5 | 20 | 0.01 | 9 | 95 | 1100 | 49 | 95 |
| CEx. 13 | 0.5 | 32 | 0 | 1.0 | 26 | 0.01 | 13 | 110 | 650 | 61 | 110 |
| CEx. 14 | 3 | 32 | 0 | 10.0 | 17 | 0.3 | 15 | 100 | 400 | 60 | — |
| CEx. 15 | 4 | 32 | 3.5 | " | 17 | 0.01 | 22 | 140 | 350 | 69 | — |

REFERENTIAL EXAMPLES 1 TO 5

One hundred parts by weight of each of the chlorinated products indicated in Table 3, 30 parts by weight of SRF carbon black, 10 parts by weight of Pb$_2$O$_3$, 2.5 parts by weight of triallyl isocyanurate, and 2.7 parts of dicumyl peroxide were kneaded by an 8-inch roll. The sheet obtained was press-cured at 160° C. for 20 minutes.

Except Referential Example 5, heating of the roll was not necessary during roll kneading. Sheeting could be done easily and rapidly, and inclusion of carbon and other ingredients could be effected quickly.

When the products of Comparative Examples 6 and 7 were used, sheeting could be done for the first time when the roll was heated to a temperature near 100° C., and long periods of time were required to include carbon and other ingredients.

The properties of the vulcanizates are shown in Table 3.

TABLE 3

| | | Properties of vulcanizate | | | | | | |
|---|---|---|---|---|---|---|---|---|
| Referential Example | Chlorinated product used | Tensile properties at 23° C. (*1) | | | | Gehmann torsional Test (*1) | | −20° C. M$_{25}$ (kg/cm$^2$) |
| | | M$_{100}$ (kg/cm$^2$) | T$_B$ (kg/cm$^2$) | E$_B$ (%) | H$_s$ (JIS A) | T$_5$ (°C.) | Freezing temperature (°C.) | |
| 1 | Example 5 | 32 | 203 | 265 | 65 | −23 | −34 | 68 |
| 2 | Example 1 | 28 | 216 | 300 | 61 | −22 | −31 | 122 |
| 3 | Example 6 | 35 | 220 | 280 | 67 | −20 | −27 | 150 |
| 4 | Example 7 | 30 | 200 | 290 | 63 | −21 | −30 | 130 |
| 5 | Comparative Example 9 | 52 | 205 | 280 | 75 | −14 | −21 | 220 |

(*1): Measured in accordance with the method of JIS K-6301.

ADHESION TEST 1

The adhesion of the after-chlorinated ethylene/butene-1 copolymer obtained in this invention to EPDM was examined.

(A) Preparation of EPDM

Seventy-five parts by weight (the same basis applies hereinafter) of Esprene 501A (a tradename for a product of Sumitomo Chemical Co., Ltd.), 50 parts of Esprene 400 (a tradename for a product of Sumitomo Chemical Co., Ltd.), 1 part of stearic acid, 5 parts of zinc oxide, 80 parts of FEF black, 30 parts of naphtenic process oil, 2 parts of mercaptobenzothizole (accelerator M), 1.5 parts of teramethylthiuram monosulfide (accelerator TS), and 0.8 part of sulfur were kneaded on a roll, and the resulting sheet was pressed at 80° C. for 1 minute to form an uncured sheet having a thickness of 1.5 mm.

(B) One hundred parts of the after-chlorinated ethylene/butene-1 copolymer, 30 parts of an ultrafine powder of magnesium silicate, 30 parts of activated calcium carbonate, 5 parts of silica, 10 parts of titanium oxide, 30 parts of di-(2-ethylhexyl)phthalate, 1 part of a polymer of 2,2,4-trimethyl-1,2-dihydroquinoline, 10 parts by weight of magnesia, 1.5 parts of trithiocyanuric acid and 2.5 parts of dicyclohexylamine-2-bnezothiazole were kneaded on a roll, and the sheet was pressed at 80° C. for 1 minute to form an uncured sheet.

(C) The uncured sheets obtained in (A) and (B) above were laminated and pressed at 160° C. for 15 minutes to form a laminate structure. It was cut to a width of 25 mm and subjected to a T-peel test. The adhesion strength was expressed by kg/inch. The state of peeling was examined. A state in which the rubber of (A) or (B) was peeled while adhering to the other was rated as "rubber fracture". Any other state of peeling was expressed as "interfacial fracture".

TABLE 4

| Test No. | 1 | 2 | 3 | 4 | 5 | 6 |
| --- | --- | --- | --- | --- | --- | --- |
| Chlorinated product used | Example 1 | Example 5 | Example 6 | Example 7 | Comparative Example 8 | Comparative Example 9 |
| Adhesion strength (kg/inch) | 6.0 | 7.0 | 5.0 | 5.7 | 3.2 | 2.5 |
| State of peeling | Rubber fracture | Rubber fracture | Rubber fracture | Rubber fracture | Interfacial fracture | Interfacial fracture |

Adhesion test 2

Adhesion Test 1 was repeated except that a blend of the after-chlorinated ethylene/butene-1 copolymer obtained in Example 1 and the after-chlorinated ethylene/butene-1 copolymer obtained in Comparative Example 9 was used instead of the after-chlorinated copolymer used in Adhesion Test 1. The results are shown in Table 5.

TABLE 5

| Test No. | 7 | 8 | 9 | 10 | 11 | 12 |
| --- | --- | --- | --- | --- | --- | --- |
| Blending ratio Copolymer of Example 1 | 100 | 80 | 60 | 40 | 20 | — |
| Copolymer of Comparative Example 9 | — | 20 | 40 | 60 | 80 | 100 |
| Adhesion strength (kg/inch) | 7.0 | 7.0 | 6.5 | 5.0 | 3.5 | 2.5 |
| State of peeling | Rubber fracture | Rubber fracture | Rubber fracture | Rubber fracture | Interfacial fracture | Interfacial fracture |

What is claimed is:

1. An after-chlorinated ethylene/butene-1 copolymer characterized by having
   (a) 1 to 2 methyl groups per 100 carbon atoms,
   (b) a chlorine content of 25 to 35% by weight,
   (c) a weight average molecular weight of not less than 100,000,
   (d) a heat of fusion, determined by differential scanning calorimetry, of not more than 0.5 cal/g, and
   (e) an ethylene content of 93 to 97% by weight and a butene-1 content of 7 to 3% by weight.

2. The after-chlorinated ethylene/butene-1 copolymer of claim 1 wherein the weight average molecular weight (c) is 100,000 to 500,000, and the heat of fusion (d) is 0 to 0.5 cal/g.

3. The after-chlorinated ethylene/butene-1 copolymer of claim 1 further characterized by having
   (f) a 100% modulus at room temperature of not more than 10 kg/cm$^2$, and
   (g) a 25% modulus at −20° C. of not more than 100 kg/cm$^2$.

4. The after-chlorinated ethylene/butene-1 copolymer of claim 3 wherein the 100% modulus at room temperature (f) is 5 to 10 kg/cm$^2$, and the 25% modulus at −20° C. (g) is 40 to 100 kg/cm$^2$.

5. A process for producing an after-chlorinated ethylene/butene-1 copolymer having a 100% modulus at room temperature of not more than 10 kg/cm$^2$ and a 25% modulus at −20° C. of not more than 100 kg/cm$^2$, which comprises a first step of chlorinating an ethylene polymer in aqueous suspension at a temperature at least 5° C. lower than the crystalline melting point determined by differential scanning calorimetry of the polymer while feeding chlorine gas, a second step of heat-treating the chlorinated ethylene polymer at a temperature higher than the crystalline melting point determined by differential scanning calorimetry of the chlorinated ethylene polymer and at least 5° C. higher than the chlorinating temperature in the first step in the substantial absence of chlorine gas without feeding chlorine gas, and a third step of chlorinating the resulting heat-treated chlorinated ethylene polymer in aqueous suspension at a temperature lower than the crystalline melting point determined by differential scanning calorimetry of the starting polymer and equal to, or lower than, the temperature in the second step with the feeding of chlorine gas until the final chlorine content is reached; characterized in that
   (a) in the first step, an ethylene/butene-1 copolymer having a density of 0.915 to 0.930, an ethylene content of 93 to 97% by weight, a butene-1 content of 7 to 3% by weight and a crystalline melting point, determined by differential scanning calorimetry, of 115° to 125° C., at least a part of said copolymer being a crystalline linear ethylene copolymer, and at least 30% by weight of said crystalline portion being meltable at a temperature of not more than 110°, is chlorinated at a temperature of 100° to 115° C. in aqueous suspension until its chlorine content reaches 10 to 20%,
   (b) the second step is carried out at a temperature at least 5° C. higher than the temperature of the first step and not higher than the crystalline melting point, determined by differential scanning calorimetry, of the starting ethylene/butene-1 copolymer, and
   (c) the third step is carried out at a temperature 6±2° C. lower than the crystalline melting point, determined by differential scanning calorimetry, of the starting ethylene/butene-1 copolymer until the chlorine content of the final product reaches 25 to 35% by weight.

* * * * *